United States Patent

[11] 3,532,148

| [72] | Inventor | Franz Kolbl |
| | | 137 Reutte Tiral, Muhl, Austria |
| [21] | Appl. No. | 696,220 |
| [22] | Filed | Jan. 8, 1968 |
| [45] | Patented | Oct. 6, 1970 |
| [32] | Priority | Jan. 9, 1967 |
| [33] | | Austria |
| [31] | | A 169/67 |

[54] TRACTION STUDS FOR VEHICLE TIRES
8 Claims, 7 Drawing Figs.

| [52] | U.S. Cl. | 152/210, 29/182.7, 75/203 |
| [51] | Int. Cl. | B60c 11/16 |
| [50] | Field of Search | 152/210; 75/203, 204; 29/182.7, 182.8 |

[56] References Cited
UNITED STATES PATENTS

| 2,023,413 | 12/1935 | Fetkenheveor | 29/182.7 |
| 2,169,090 | 8/1939 | Eawihl | 29/182.7 |
| 2,971,839 | 2/1961 | Nussbaum | 29/182.7X |
| 3,125,147 | 3/1964 | Hakka | 152/210 |

FOREIGN PATENTS

| 376,912 | 7/1932 | Great Britain | 29/182.7 |

*Primary Examiner*—Benjamin R. Padgett
*Assistant Examiner*—Arthur J. Steiner
*Attorney*—Ostrolenk, Faber, Gerb & Soffen ABSTRACT: Instead of a tungsten carbide phase with 7 to 10 wt. percent cobalt metal phase, anti-skid traction studs for vehicle tires are made with 90 to 78 wt. percent of a metal phase consisting of 43 to 89 wt. percent titanium carbide, 1 to 45 wt. percent of molybdenum and/or vanadium carbide and with 10 to 22 wt. percent of a metal phase selected from the iron group of metals in the periodic table. In studs made without molybdenum carbide, up to 50 wt. percent of the vanadium carbide content may be replaced with niobium carbide. Traction studs with 63 to 72 wt. percent titanium carbide, 10 to 25 wt. percent molybdenum carbide and 12 to 17 wt. percent nickel are very effective. Up to 22.5 wt. percent of the metal carbide phase may be replaced with tungsten carbide. Up to 3 wt. percent of the stud may consist of chromium as part of the metal phase.

Patented Oct. 6, 1970
3,532,148
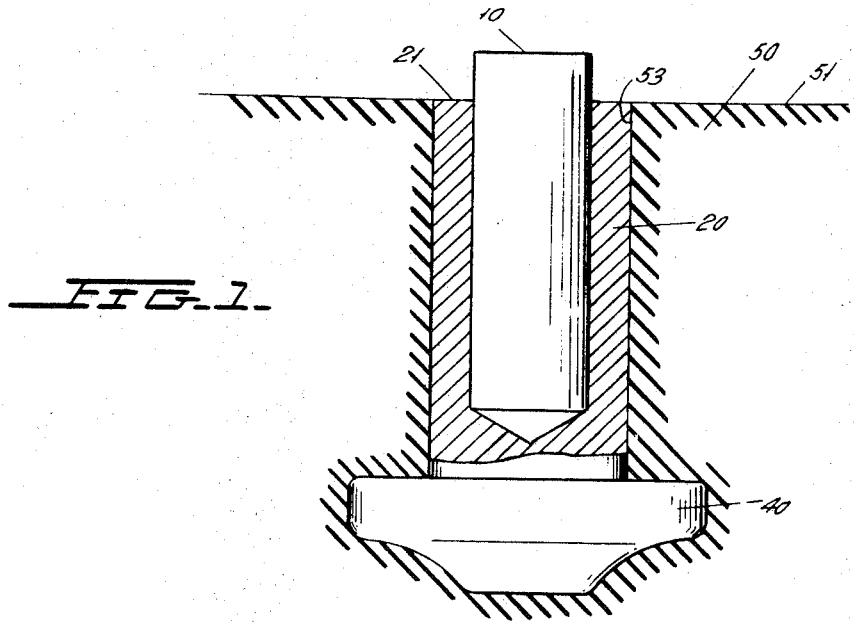
*FIG_1_*
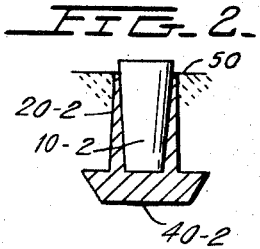
*FIG_2_*
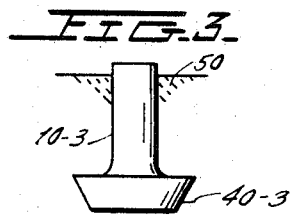
*FIG_3_*
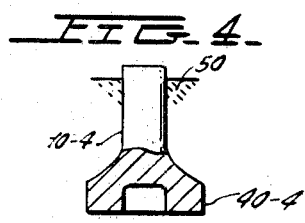
*FIG_4_*
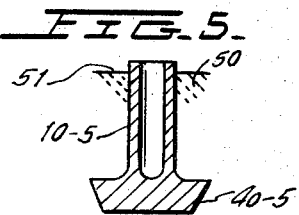
*FIG_5_*
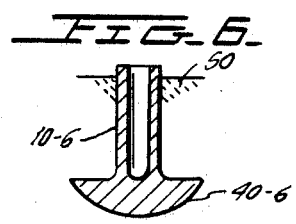
*FIG_6_*
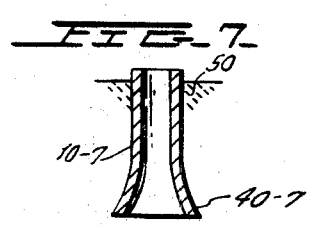
*FIG_7_*

TRACTION STUDS FOR VEHICLE TIRES

Tire traction studs usually consist of a hard-metal structure held affixed within the tire body for engagement with road surface to suppress tire skidding. U.S. Pat. No. 2,652,876 is one of a number of publications which describe examples of such traction studs. In some cases the hard metal traction studs are held within the tire rubber body with an anchor sleeve.

Heretofore, the consumable tire traction studs have been made of tungsten carbide usually containing 7 to 10 wt. percent cobalt. It has also been proposed to use for such antiskid traction studs other metal carbides, for example, the carbides of Si, Ti, Ta, Nb and Cr without in any way specifying the proportions in which these different carbides should be combined in order to provide an antiskid traction stud of the required strength and wear resistance. Traction studs made with these multi-metal carbides have not been available up to the present because they proved to be too brittle. [Unless otherwise stated, throughout the specification and claims, all proportions are given in weight % (percent), sometimes indicated by the symbol "wt. percent"] Disturbing limitations encountered with the heretofore used tungsten carbide traction studs was, not only their high price, but also the fact that — because of their high specific weight — at high vehicle velocities, the high centrifugal forces tear them out occasionally of their tire anchorage.

Titanium base carbides have been used to a limited extent, as metal milling tools. For milling steel, there has been used to a limited extent tools combining 25 to 75 wt. percent titanium carbide, 5 to 40 wt. percent vanadium carbide, 5 to 25 wt. percent niobium carbide and 1 to 20 wt. percent molybdenum carbide with 5 to 25 wt. percent of a metal of the iron group, for example, nickel. However, such titanium base metal carbides proved unsatisfactory for grinding surfaces of steel or like metal bodies.

Surprisingly, the invention is based on the discovery that antiskid tire traction studs made with 43 to 89 wt. percent titanium carbide, 1 to 45 wt. percent of molybdenum carbide and/or vanadium carbide with 10 to 22 wt. percent of metal addition of the iron group proved to be excellent in respect to breakage strength and wear resistance and toughness when used as traction studs although they had, at most, about half the weight of a corresponding tungsten carbide base traction studs. In such traction studs of the invention, which are made without molybdenum carbide, up to 50 percent of the specified vanadium carbide content may be replaced by niobium carbide.

The invention also involves the discovery that in traction studs made with the above specified combination of titanium carbide and molybdenum carbide, it is of advantage to somewhat reduce their carbon content below the stoichiometric compositions of the specified metal carbides. Such carbon content reduction may be secured, for example, embodying in the powder mixture used in producing the specified metal carbides somewhat more of the metal ingredient than required for producing the specified carbide. As an example, in producing the 20 wt. percent molybdenum carbide ingredient, 15 wt. percent of molybdenum carbide is alloyed with 5 percent of molybdenum.

In the above specified metal carbide compositions used for tire studs of the invention 25 percent of the specified metal carbide content may be replaced with tungsten carbide. In addition, up to 3 wt. percent of the stud may consist of chromium.

Very effective and excellent antiskid traction studs are obtained with the below specified proportion ranges of their different ingredients:

63 to 78 wt. percent titanium carbide
10 to 25 wt. percent molybdenum carbide
12 to 17 wt. percent nickel.

Traction studs made with the above specified proportions of the metal carbide and metal ingredients have a specific weight of only 5 to 7 gr./cm.$^3$ (gram per cubic centimeter) compared with 14.5 to 15 gr./cm.$^3$ or about one-half the weight of the heretofore used tungsten carbide base traction studs. The specified combination of metal carbides and metal ingredients for traction studs of the invention exhibit a surprisingly excellent ability of becoming sintered into a tough and abrasion resistant traction-stud body which has excellent strength under bending strains. As an example, such traction studs of the invention resist breakage under bending strains up to 145 Kg./mm.$^2$ (kilogram per millimeter square).

Within the specified range of metal carbide and metal ingredient proportions, the traction studs of the invention may be produced with any desired grades of hardness and abrasion resistance required for meeting the different antiskid-protection conditions. Below are specific examples of compositions suitable for traction studs of the invention:

EXAMPLE 1

64 wt. percent titanium carbide
18 wt. percent molybdenum carbide
15 wt. percent nickel
Balance tungsten, iron and chromium up to 3 wt. percent of the stud.

EXAMPLE 2

60 wt. percent titanium carbide
12 wt. percent vanadium carbide
9 wt. percent niobium carbide
10 wt. percent iron
5 wt. percent nickel
Balance tungsten and up to same proportion of chromium.

EXAMPLE 3

71 wt. percent titanium carbide
3 wt. percent molybdenum carbide
17 wt. percent nickel
Balance tungsten, iron up to the same proportion of chromium.

In producing traction studs of the invention, powder particles of the different carbide and additional metal ingredients are thoroughly mixed and after compacting and/or extruding into the shape of the traction stud they are subjected to known sintering in a protective atmosphere. Alternatively, mixtures of powder particles of the binary or ternary carbides having the above specified carbide and metal additional proportions are compacted into stud-shaped compacts and thereafter subjected to a similar sintering treatment. Production of the traction studs with powder particles of such specified binary or ternary multicarbides is advantageous because they may be produced with individual metal carbide ingredients of a technical purity grade with respect, for example, to oxygen or nitrogen impurities.

Known powder-metallurgy techniques may be used for production of traction studs having the specified compositions and shape, such as compacting or extruding the specified ingredient mixture, followed by presintering, followed by final shaping and final sintering treatments. To suppress loss of carbon from the sintered metal carbides, a large number of the compacted studs may be held in a carbon crucible during the sintering treatment.

In the annexed drawings:

FIG. 1 is a vertical cross-sectional view of the rubber body of a vehicle tire having embedded and affixed therein an antiskid traction stud formed with the above described multicarbide compositions of the invention; and FIGS. 2 through 7 are views similar to FIG. 1 showing other shapes of traction studs made with compositions of the invention.

Referring to FIG. 1, within each of an array of recesses 53 along the traction surface 51 of the rubber body 50 of a vehicle tire is held an antiskid traction stud 10 so that a short portion thereof projects above the tire traction surface 51. The traction stud 10, or at least half or a major section of its axial length is made out of one of the above described examples of the metal carbide compositions of the invention. The tire stud 10 is affixed within the interior of an anchoring sleeve 20. The anchoring sleeve 20 may be made of any metal suitable or used for such traction stud sleeves and is secured to the surrounded traction stud 10 in any known way. For example, the sleeve may be made of iron, brass or similar metals. The stud 10 is forced into the interior of the sleeve 20 or is otherwise affixed therein as by rolling, compacting, forging, brasing, soldering, sintering or the like. The inward end of the anchoring sleeve 20 has a wider anchor section 40. The anchor section 40 has an inwardly facing generally conical surface which, for example, facilitates forcing the stud 10 with its sleeve 20 into a correspondingly shaped, tightly fitting recess 53 of tire rubber body 50. The outwardly directed surface of anchoring section 40 is flat in a direction transverse to the stud axis to secure anchoring thereof within the tire recess 53.

FIG. 2 is similar to FIG. 1 and likewise shows a similar rubber tire body 50 with a traction surface 51 holding similarly affixed in recesses thereof an array of traction studs 10–2, of similar composition. Each stud 10–2 is affixed within a surrounding analogous metallic anchor sleeve 20–2. The stud 10–2 is of slightly conical shape and its inward diameter adjoining the wider sleeve-anchoring end is of somewhat smaller diameter than its outer diameter. This conical shape of stud 10–2 facilitates the forcing thereof into affixing engagement with the surrounding length of its anchoring sleeve 20–2. The wider inward end 40–2 of the anchoring sleeve 20–2 is of frustoconical shape to enable forcing its smaller inward end together with its stud 10–2 into the respective recess of tire body 50.

FIGS. 3 to 7 show other shapes of traction studs 10–3 to 10–7, respectively, each made with compositions of the invention and held anchored within a recess of similar tire body 50, but without any anchoring sleeve. Each of these tire traction studs 10–3 to 10–7 is made with a wider inward anchoring section 40–3 to 40–7 respectively, for holding it anchored within the recess of the tire rubber body 50.

The traction stud of FIG. 7 is made by a known powder metallurgy extrusion process. A mixture of the specified metal carbide and metal ingredients which contains a plasticizer addition is extruded into a compressed long and hollow tubular body. The resulting compressed elongated tubular body is then cut into short tube sections having the desired stud length taking into consideration dimensional changes caused by the sintering and further treatments. Each tube section 10–7 is spread at one end to give it the shape of its wider inward anchoring section 40–7. The so-shaped tube sections are then subjected to the sintering treatment which yields the desired traction studs 10–7.

The principles of the invention described above in connection with specific exemplifications will suggest modifications thereof. It is, accordingly, desired that the appended claims shall not be limited by the described exemplifications of the invention.

I claim:

1. For a vehicle tire having a tire body establishing traction engagement with a road and the like, an axially extending elongated traction stud embedded in a generally radial direction within said tire body; said stud having an outer end portion which establishes skid resistant abrasion engagement with the road; said outer end portion consisting of a sintered metallic carbide composition, consisting of 90 to 78 wt. percent carbide phase consisting essentially of 43 to 89 wt. percent titanium carbide and 1 to 45 wt. percent of an additional carbide selected from the group consisting of molybdenum carbide, vanadium carbide;

up to 25 wt. percent of said specified carbide content consisting essentially of tungsten carbide; and 10 to 22 wt. percent of said outer end portion of the stud consisting essentially of a metal phase selected from the metals of the iron group of the Periodic Table and up to 3 wt. percent of said stud consisting essentially of chromium constituting part of said metal phase.

2. A tire traction stud as claimed in claim 1, the carbon content of at least some of said specified carbides having a lesser carbon content than the corresponding stoichiometrical composition of the said respective specified carbides.

3. For a vehicle tire having a tire body establishing traction engagement with a road and the like, an axially extending elongated traction stud embedded in a generally radial direction within said tire body; said stud having an outer end portion which establishes skid resistant abrasion engagement with the road; said outer end portion consisting of a sintered metallic carbide composition, consisting of 90 to 78 wt. percent of carbide phase consisting essentially of 43 to 89 wt. percent titanium carbide and 1 to 45 wt. percent of vanadium carbide and up to 22.5 wt. percent of said vanadium carbide being replaced by niobium carbide up to 25 wt. percent of said specific carbide content consisting essentially of tungsten carbide; and 10 to 22 wt. percent of said outer end portion of the stud consisting essentially of a metal phase selected from the metals of the iron group of the Periodic Table and up to 3 wt. percent of said stud consisting essentially of chromium constituting part of the metal phase.

4. A tire traction stud as claimed in claim 3, the carbon content of said specified carbides having a lesser carbon content than corresponding to the stoichiometrical composition of the respective specified carbides.

5. A tire traction stud as claimed in claim 1, wherein 88 to 83 wt. percent of said end portion consists of a carbide phase which consists essentially of 63 to 78 wt. percent of titanium carbide, 10 to 25 wt. percent molybdenum carbide;

12 to 17 wt. percent of said outer end portion of the stud consisting essentially of a metal phase selected from the metals of the iron group of the periodic table.

6. A tire traction stud as claimed in claim 5, the carbon content of at least some of said specified carbides having a lesser carbon content than the corresponding stoichiometrical composition of said respective specified carbides.

7. A tire traction stud as claimed in claim 1, wherein 88 to 85 wt. percent of said end portion consists of a carbide phase which consists essentially of 63 to 78 wt. percent of titanium carbide, 10 to 25 wt. percent molybdenum carbide, and 12 to 15 wt. percent of said stud section consisting essentially of nickel.

8. A tire traction stud as claimed in claim 7, the carbon content of said specified carbides having a lesser carbon content than corresponding to the stoichiometrical composition of said respective specified carbides.